United States Patent
Will

(10) Patent No.: US 9,137,134 B2
(45) Date of Patent: Sep. 15, 2015

(54) RECURSIVE IDENTIFICATION OF INDIVIDUALS FOR CASUAL COLLABORATIVE CONFERENCING

(71) Applicant: Rockstar Consortium US LP, Plano, TX (US)

(72) Inventor: Craig Alexander Will, Fremont, CA (US)

(73) Assignee: RPX Clearinghouse, LLC, San Francisco, CA (US)

(*) Notice: Subject to any disclaimer, the term of this patent is extended or adjusted under 35 U.S.C. 154(b) by 0 days.

(21) Appl. No.: 14/137,420

(22) Filed: Dec. 20, 2013

(65) Prior Publication Data
US 2014/0108554 A1   Apr. 17, 2014

Related U.S. Application Data

(63) Continuation of application No. 13/429,128, filed on Mar. 23, 2012, now Pat. No. 8,625,768, which is a continuation of application No. 12/950,749, filed on Nov. 19, 2010, now Pat. No. 8,442,199, which is a continuation of application No. 12/605,168, filed on Oct. 23, 2009, now Pat. No. 7,860,229, which is a continuation of application No. 10/625,493, filed on Jul. 23, 2003, now Pat. No. 7,627,102, which is a continuation of application No. 09/371,781, filed on Aug. 10, 1999, now Pat. No. 6,721,410.

(51) Int. Cl.
| H04M 3/42 | (2006.01) |
| G06F 15/16 | (2006.01) |
| H04L 12/26 | (2006.01) |
| H04L 12/18 | (2006.01) |
| H04M 3/533 | (2006.01) |
| H04M 3/56 | (2006.01) |
| H04L 29/08 | (2006.01) |
| H04L 29/06 | (2006.01) |

(52) U.S. Cl.
CPC .............. *H04L 43/10* (2013.01); *H04L 12/1818* (2013.01); *H04L 12/1822* (2013.01); *H04L 65/403* (2013.01); *H04L 67/22* (2013.01); *H04M 3/533* (2013.01); *H04M 3/56* (2013.01); *H04L 67/38* (2013.01); *H04M 2203/2044* (2013.01); *H04M 2203/4536* (2013.01)

(58) Field of Classification Search
USPC .......... 379/202.01, 201.11; 709/217, 219, 204
See application file for complete search history.

(56) References Cited

U.S. PATENT DOCUMENTS

| 5,598,351 A | 1/1997 | Chater et al. |
| 5,781,614 A | 7/1998 | Brunson |

(Continued)

OTHER PUBLICATIONS

Non-Final Office Action for U.S. Appl. No. 09/371,781, mailed Sep. 6, 2002, 8 pages.

(Continued)

*Primary Examiner* — Thjuan K Addy
(74) *Attorney, Agent, or Firm* — Withrow & Terranova, PLLC

(57) ABSTRACT

A method for real-time communication among two or more individuals separated in space. The method includes the steps of determining that a first individual is likely to be interested in communicating with a second individual via a first communications link; retrieving information via the first communications link about one or more additional individuals from electronic memory means associated with the second individual; and establishing communication with at least one of the additional individuals based on the retrieved information.

20 Claims, 2 Drawing Sheets

(56) References Cited

U.S. PATENT DOCUMENTS

| | | | |
|---|---|---|---|
| 5,832,229 A * | 11/1998 | Tomoda et al. | 709/227 |
| 5,841,966 A | 11/1998 | Irribarren | |
| 5,872,923 A | 2/1999 | Schwartz et al. | |
| 5,894,556 A | 4/1999 | Grimm et al. | |
| 5,907,677 A | 5/1999 | Glenn et al. | |
| 5,920,692 A | 7/1999 | Nguyen et al. | |
| 6,029,195 A | 2/2000 | Herz | |
| 6,119,178 A | 9/2000 | Martin et al. | |
| 6,148,067 A | 11/2000 | Leipow | |
| 6,175,831 B1 | 1/2001 | Weinreich et al. | |
| 6,269,369 B1 | 7/2001 | Robertson | |
| 6,317,781 B1 | 11/2001 | De Boor et al. | |
| 6,393,423 B1 | 5/2002 | Goedken | |
| 6,721,410 B1 | 4/2004 | Will | |
| 7,349,907 B2 * | 3/2008 | Celik | 1/1 |
| 7,627,102 B2 | 12/2009 | Will | |
| 7,739,139 B2 | 6/2010 | Robertson et al. | |
| 7,860,229 B2 | 12/2010 | Will | |
| 8,442,199 B2 | 5/2013 | Will | |
| 8,542,811 B2 | 9/2013 | Will | |
| 8,625,768 B2 | 1/2014 | Will | |
| 2005/0149487 A1 | 7/2005 | Celik | |
| 2007/0083594 A1 | 4/2007 | Ludwig et al. | |
| 2009/0282121 A1 | 11/2009 | Robertson et al. | |
| 2010/0153504 A1 | 6/2010 | Will | |
| 2011/0153747 A1 | 6/2011 | Will | |
| 2012/0185535 A1 | 7/2012 | Will | |
| 2012/0185548 A1 | 7/2012 | Will | |

OTHER PUBLICATIONS

Final Office Action for U.S. Appl. No. 09/371,781, mailed Apr. 23, 2003, 9 pages.

Notice of Allowance for U.S. Appl. No. 09/371,781, mailed Nov. 20, 2003, 8 pages.

Non-Final Office Action for U.S. Appl. No. 10/625,493, mailed Dec. 14, 2006, 8 pages.

Final Office Action for U.S. Appl. No. 10/625,493, mailed Aug. 9, 2007, 11 pages.

Non-Final Office Action for U.S. Appl. No. 10/625,493, mailed Jan. 28, 2008, 9 pages.

Non-Final Office Action for U.S. Appl. No. 10/625,493, mailed Aug. 21, 2008, 5 pages.

Final Office Action for U.S. Appl. No. 10/625,493, mailed Jan. 7, 2009, 7 pages.

Notice of Allowance for U.S. Appl. No. 10/625,493, mailed Jul. 23, 2009, 4 pages.

Notice of Allowance for U.S. Appl. No. 12/605,168, mailed Oct. 19, 2010, 7 pages.

Non-Final Office Action for U.S. Appl. No. 12/950,749, mailed Oct. 1, 2012, 9 pages.

Notice of Allowance for U.S. Appl. No. 12/950,749, mailed Jan. 18, 2013, 5 pages.

Non-Final Office Action for U.S. Appl. No. 13/429,128, mailed May 9, 2013, 7 pages.

Notice of Allowance for U.S. Appl. No. 13/429,128, mailed Sep. 4, 2013, 6 pages.

Non-Final Office Action for U.S. Appl. No. 13/429,142, mailed Jan. 16, 2013, 6 pages.

Notice of Allowance for U.S. Appl. No. 13/429,142, mailed May 24, 2013, 6 pages.

* cited by examiner

RECURSIVE IDENTIFICATION OF INDIVIDUALS FOR CASUAL COLLABORATIVE CONFERENCING

CROSS-REFERENCE TO RELATED APPLICATIONS

This application is a continuation of prior U.S. application Ser. No. 13/429,128 filed Mar. 23, 2012, which is a continuation of U.S. application Ser. No. 12/950,749 filed Nov. 19, 2010, now U.S. Pat. No. 8,442,199, which is a continuation of U.S. application Ser. No. 12/605,168, filed Oct. 23, 2009, now U.S. Pat. No. 7,860,229, which is a continuation of prior U.S. application Ser. No. 10/625,493, filed Jul. 23, 2003, now U.S. Pat. No. 7,627,102, which is a continuation of prior U.S. application Ser. No. 09/371,781 filed on Aug. 10, 1999, now U.S. Pat. No. 6,721,410, which are hereby incorporated by reference.

BACKGROUND OF THE INVENTION

A. Field of the Invention

The present invention relates generally to the field of telecommunications, and more particularly to casual collaborative conferencing.

B. Description of the Related Art

The World Wide Web (WWW), one type of service provided through the Internet, allows a user to access a universe of information which combines text, audio, graphics and animation within a hypermedia document. Links are contained within a WWW document which allow simple and rapid access to related documents. The WWW was developed to provide researchers with a system that would enable them to quickly access all types of information with a common interface, removing the necessity to execute a variety of numerous steps to access the information. During 1991, the WWW was released for general usage with access to hypertext and UseNet news articles. Interfaces to WAIS, anonymous FTP, Telnet and Gopher were added. By the end of 1993, WWW browsers with easy to use interfaces had been developed for many different computer systems.

UseNet is a network of news groups on thousands of different topics which allow the on-line discussion through the posting of individual messages (articles) which can be read by participants. An article is similar to an e-mail message, having a header, message body and signature.

Internet Relay Chat (IRC) is an example of a program that facilitates Web chat. "Chatting" is the term used for the network equivalent of the old telephone party line. IRC is accessed through an Internet connection. This technology permits the user to chat with users from all over the world about hundreds of different subjects at any time. In a way, it is as if the UseNet newsgroups were a live discussion group rather than postings.

The word "chat" may be somewhat misleading, because persons participating in a chat session are not necessarily speaking, but they are typing and reading text messages that chat participants write. Moreover, if the information communicated is not only in text form, but is real-time audio and video, chat rooms are better described by the term virtual space rooms. Once a person enters a chat room, which is really just a web page, that person can choose to only read the exchanges, known as lurking, or the person can join in and post messages.

Many chat rooms focus the conversation on specific topics, such as health, politics, and football. In that way, people with similar interests can find one another.

The first step for a person interested in joining a chat session, is to locate a chat room that interests the person. Once the person is on the web site (leading to the chat room), the interested person will usually be asked to register. For privacy purposes, people do not register using their real name, but instead people make up a name.

Once the person is equipped with a registration name, the person clicks a button and follows the instructions on the web site to choose a chat room, depending on the interests of the person. Joining a chat room is like walking into a room full of people talking to each other, sometimes with several conversations going on at once. Once inside the chat room, the person will probably find himself or herself in the middle of a conversation. There is no need to jump into the conversation. It is not uncommon for chat rooms to have many more lurkers than participants. As the interaction continues, new postings appear on the computer screen. When the person decides to join the conversation, all it takes is to type a message in a blank box in the screen and click a Talk button (or hit the Enter or Return key on the keyboard). Soon the message will be posted in the chat room and people may respond. In addition to chatting on a chat room where the text is broadcast to everyone on that chat room, there are ways to enter into a private chat.

A number of Internet phone software products offer voice capabilities in real time over the Internet. Internet phoneware vendors typically provide their own directory servers, organized by topic as well as by name. Voice quality varies from moment to moment. Such variations are due to the processing delay that results from encoding and decoding the conversation as well as the inherent delay of the Internet, which varies according to the amount of traffic at any given time and the route through which the signal must travel.

The Web chat is, however, only one level of an area of technology known as collaborative conferencing. Collaborative conferencing is the ability for two or more individuals to work together in real-time, in a coordinated manner over time and space by using computers. Collaborative conferencing is not limited to a live text exchange, but includes data conferencing/shared whiteboard applications, group interactive document editing, and audio and video multi-point conferencing among others.

The technique of Internet chat has the disadvantage that it is limited in the choices that individuals can make respecting whom they want to establish communication with. Namely, they have to join a chat room that has a specific discussion topic, and can only pick people in that chat room with whom to engage in a private chat. To solve this problem, a solution has been proposed and implemented, in which matches between different individuals connected to the WWW are created. This requires the inconvenient step of requesting information to the user, so as to create a user profile, and thus, perform matches based on those profiles.

Therefore, there is a need in the art for a system that offers more flexibility to individuals to choose other individuals with whom they want to engage in a conversation, the conversation not being limited to a conventional Internet chat (text).

SUMMARY OF THE INVENTION

Accordingly, it is an object of the present invention to meet the foregoing needs by providing systems and methods that efficiently enable real-time communication among two or more individuals separated in space.

Specifically, a method for meeting the foregoing needs is disclosed. The method includes the steps of determining that a first individual is likely to be interested in communicating with a second individual via a first communications link; retrieving information via the first communications link about one or more additional individuals from electronic memory means associated with the second individual; and establishing communication with at least one of the additional individuals based on the retrieved information.

Both the foregoing general description and the following detailed description provide examples and explanations only. They do not restrict the claimed invention.

DESCRIPTION OF THE DRAWINGS

The accompanying drawings, which are incorporated in and constitute a part of this specification, illustrate embodiments of the invention and, together with the description, explain the advantages and principles of the invention. In the drawings.

DETAILED DESCRIPTION

Figure 1:
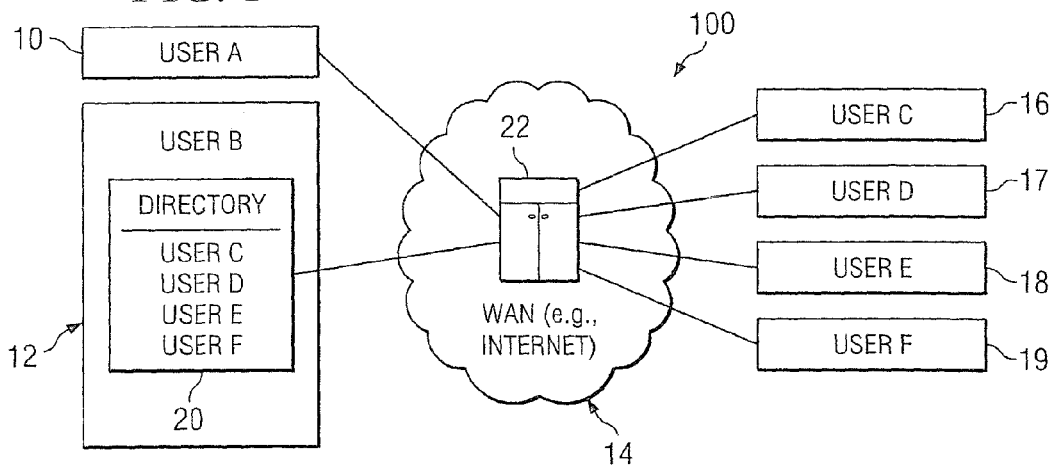
FIG. 1 is a block diagram of a collaborative conferencing system.

Reference will now be made to preferred embodiments of this invention, examples of which are shown in the accompanying drawings and will be obvious from the description of the invention. In the drawings, the same reference numbers represent the same or similar elements in the different drawings whenever possible.

Systems and methods consistent with the present invention perform collaborative conferencing by using recursive identification of individuals. For purposes of the following description, the systems and methods consistent with the present invention are mainly described with respect to Internet chat. The description should be understood to apply to other levels or modes of operation in a collaborative conferencing system, such as a casual collaborative conversation with persons in a virtual space room.

FIG. 1 shows a general collaborative conferencing system 100. The system includes communication means associated with users A-F (10, 12 and 16-19), a Wide Area Network (WAN) 14, and a chat server 22. The WAN 14 is any network that is capable of transferring data at speeds fast enough as to support collaborative conferencing. An example of a WAN is the Internet. The chat server 22 is a computer connected to the WAN 14 that offers a chat service. That is, the chat server 22 runs software that enables the creation of a chat room. The users A-F can enter the chat room if connected to the chat server 22. As mentioned above, a chat room is nothing more that a web page, which in this case is supported by the chat server 22. By contrast, supporting a virtual space room might require equipment other than a single server. Support for the virtual space room can be offered by several servers (not shown) that are part of the WAN 14.

In the system 100, user A determines that user B is a person that is likely to be interesting enough so as to get involved in a casual collaborative conversation with that person. That is, if user A believes that he or she shares common interests with user B, user A will engage in collaborative conferencing with user B. This determination is made after obtaining information about user B. The information is obtained by communicating with user B. The manner in which user A communicates with user B in order to determine whether he or she is likely to be interested in communicating with user B (possibly via some other communication means or links) includes, but is not limited to, telephonic conversations, e-mail, voice mail, real-time video, and real-time text.

Once user A determines he or she is likely to be interested in communicating with user B, user A targets or spots user B when user B enters into a chat room or virtual space room. User A will see on his computer screen (208 in FIG. 2) either the name or an image of user B whenever user B is "on-line". Each user in the system 100 has a personal directory 20 containing the names of other people with collaborative conferencing capability.

Unlike conventional methods of matchmaking in a chat room context, user A does not rely on a computer program to pick interesting persons for him or her. Instead, user A relies on user B's personal directory 20 as a starting point to find more interesting persons. User A accesses some of the information contained in directory 20 about other users with collaborative conferencing capability, with whom user B communicates. This technique is called recursive identification of individuals. The information that user A can access is limited according to permissions assigned to each record in the directory by user B.

Figure 3:
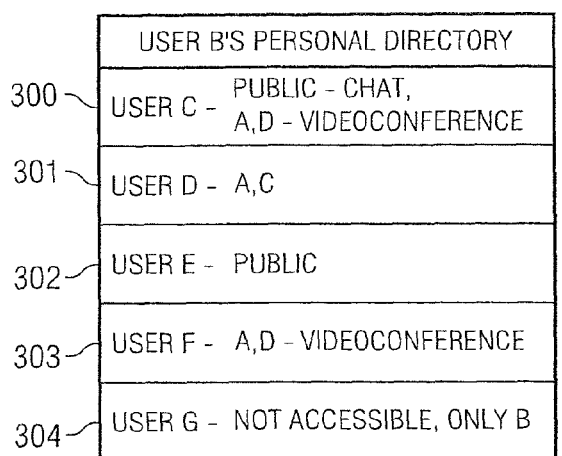
FIG. 3 is an example of an user's personal directory according to the present invention.

FIG. 3 shows an example of different permissions designated by user B. The directory 20 contains individual records 300-304 that correspond to individuals with collaborative conferencing capability. The list of users (300-304) is by no means extensive and is not representative of all of the possible users that could be included in the directory 20. Records 300-304 contain user information that includes, but is not limited to, users' e-mail address, users' names and virtual space room login names, picture id's, etc.

There are different levels of permissions that the user B can assign to the users records (300-304) in the directory 20. Because any other user of the system in the present invention can get access to some information, user 12 assigns access permissions to records 300-304. These permissions define how much information can be accessed by the other users via their respective communications means (10 and 16-19 in FIG. 1).

One level of access corresponds to the type of service that is used within the system. In FIG. 3, the record 300, corresponding to user C, can be accessed by the entire public that communicates with user B via Web chat (e.g., a chat server 22). The term "public" refers to all of the persons with collaborative conferencing capabilities. On the other hand, when another level in collaborative conferencing is in use, namely, video conferencing, only users A and D can access record information 300 about user C from user B's directory 20.

Other levels of permissions include, but are not limited to, giving the public access to the entire directory 20, giving specific persons access to the entire directory 20, giving the public access to information contained in some of the records 300-304, and giving specific persons access to information contained in some of the records 300-304.

The directory 20 can be created by user B manually. That is, user B can gather a list of names of individuals that he or she communicates with, and enters that list into the directory 20. In the present invention, an alternative to manually creating the directory is to have the software that enables collaborative conferencing create the directory 20 for the user. The software has a routine that monitors the communication between user B and other users (e.g., C-F) and that adds to the directory 20 information about the users that communicate with user B. As an option, the software can sort the information in the directory 20, according to the frequency of the communications between user B and the individuals named in the directory 20. Moreover, another option consists of automatically deleting information from the directory 20, when the software determines that persons that do not communicate frequently with user B, have not actually communicated with user B for specified period of time. For example, the software could look at the sorted directory 20, and determine whether the individual whose information is at the bottom of the directory (less frequency) has communicated with user B in the past two months. If the person at the bottom has not done so, that person's information is deleted from the directory 20. The period of two months is only an example of a parameter that can be adjusted according to the directory's owner preferences.

Figure 2:
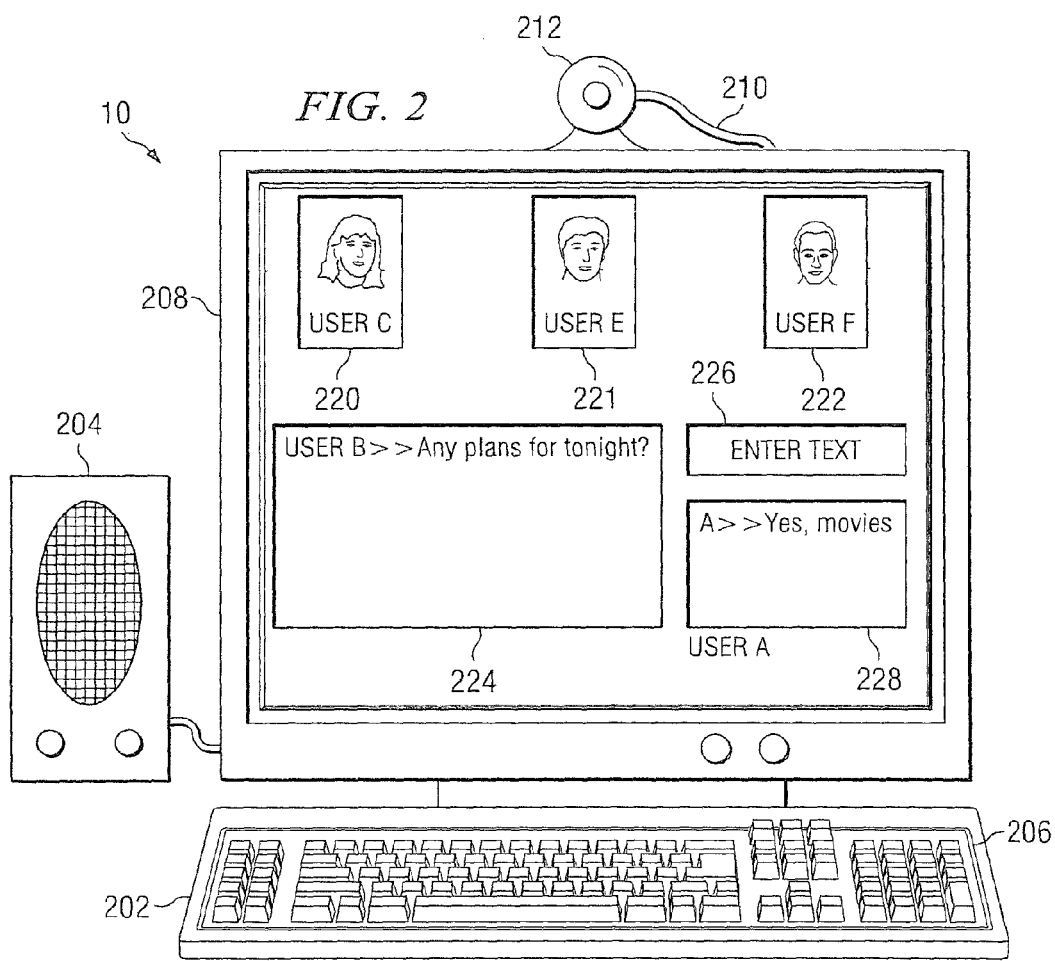
FIG. 2 is a block diagram of a computer system associated with user A in FIG. 1.

FIG. 2 shows communication means 10 for enabling communication between user A and other users (e.g., users B-F) of the system 100, and that corresponds to user A in this particular example. The communication means 10 includes a computer system 202 with a keyboard 206 and a screen 208; and a speaker 204, camera 212, and microphone 210 connected to the computer 202. The computer 202 runs software that displays on screen 208 a representation of other users 220-222 present (on-line) in a virtual space room. The ability of communicating with these other parties in real-time via the computer system 202 is what makes the system a collaborative conferencing system.

The computer 202 only displays an image of those users that have been determined to be of interest to user A 10. As seen on FIG. 2, user A has determined that he or she is likely to be interested in communicating with users C, E and F. The representation of users C, E and F in the computer screen is denominated by numerals 220-222, and it includes image information as well as other personal information about the users. User A uses different means to communicate with any of the users in the virtual space room. These means include, but are not limited to, voice, interactive text (chat), e-mail, and video.

The speaker 204 is used for listening to voice messages sent by the users in the virtual space room. On the other hand, the microphone 210 is used to send voice messages to users in the virtual space room. These voice messages are either voice mail messages, stored either locally in the computer 202 or in some other recording means, or real-time voice messages (i.e., real-time telephony).

The camera 212 is used to capture an image of user A, which is presumably displayed in the computer screen associated with other users participating in the virtual space room. The camera 212 is turned off when user A does not desire to transmit an image of herself/himself. It is possible to have a participant in the virtual space room that does not want his or her image displayed. For example, a chat window 224 displays interactive text communications between user B and user A. As seen from the display, an image of user B is not shown in the screen 208. The chat window 224 is used by any of the users in the virtual space room, and its use is limited to displaying text messages from all of the parties, as it would for a conventional chat room.

When user A decides to communicate via interactive text, he or she needs to type the message on the keyboard 206. The user can edit the entered text which is displayed on the window 228. After the changes have been entered, the text is displayed on the chat window 224 when user A hits the button 226 displayed on the screen 208.

By comparing FIG. 2 and FIG. 3, one notices that the image representations 220-222 displayed on screen 208 of user A's computer system 202 match the permissions associated to users C, E and F (300, 302 and 303 in FIG. 3). As discussed above, user A has determined that user B is likely to be an interesting person. This is evidenced by the interactive text exchange between user A and user B, shown in windows 224 and 228 of FIG. 2. It is also evident from FIG. 2, that user A could have accessed the directory 20 in order to access information about users C, E and F. Thus, user A determined that users C, E and F are also likely to be interesting. User A could have also determined that user D is likely to be an interesting person, even though user D is not displayed on screen 208. Only users that are on-line are displayed on the screen 208.

Figure 4:
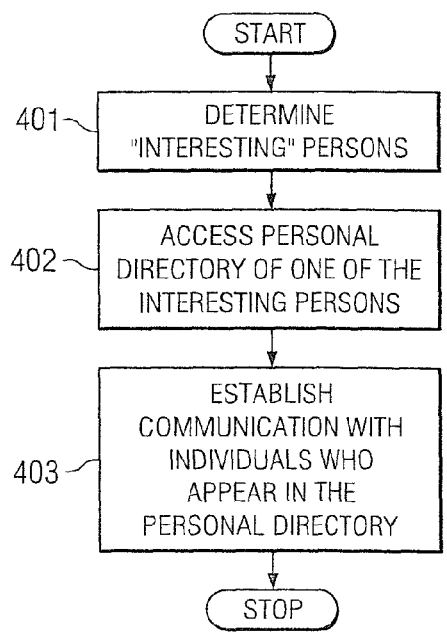
FIG. 4 is a flowchart describing the steps to establish real-time communication according to the present invention.

FIG. 4 shows a method for performing collaborative conferencing in accordance with the present invention. In step 401 a first user determines which persons are likely to be interesting. As discussed previously, this determination can be done for a single person, and then the determination of additional persons likely to be interesting can be expanded by looking at the directory of the first persons determined to be likely interesting. In step 402, the first user accesses the personal directory of one of the likely interesting persons. This step is not limited to the first person that was determined to be likely interesting. Once a list of likely interesting persons have been put together by the first user, he or she can go into the directory of any of the individuals in that list.

After the first user has determined likely interesting persons and has accessed the directory of a first likely interesting person, the first user establishes communication with the persons who are determined to be likely interesting. This communication takes place in a virtual space room context.

Figure 5:
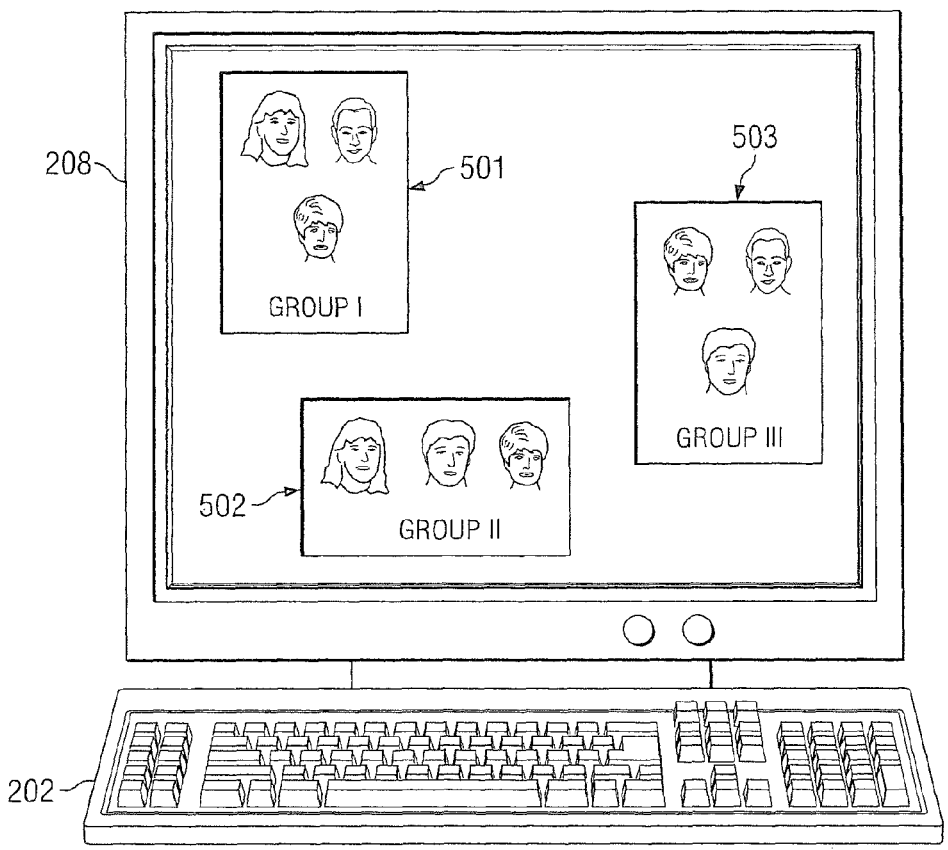
FIG. 5 is a diagram showing a second mode of operation of the computer system in FIG. 2.

FIG. 5 shows an alternative embodiment of the present invention. The software running on the computer 202 allows persons in a virtual space room to be separated in subgroups. These subgroups are displayed 501-503 on the computer screen 208. Persons in Group I 501, cannot communicate with persons outside Group I 501 (Group II 502, Group III 503). Assuming that user A belongs to Group I 501, user A can still see in the computer screen 208 who is in the other groups. If user A wants to communicate with individuals from the other groups, user A must change groups in order to accomplish the desired communication. For example, if user A is in Group I 501, and notices that user B (a person that is likely to be interesting) is in Group II 502, user A would have to enter Group II 502 in order to communicate with user B. Once user A transfers to Group II 502, an image representation of user A would appear in the area of the computer screen that corresponds to Group II 502.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. The scope of the invention is defined by the claims and their equivalents.

What is claimed is:

1. A method of providing a collaborative conferencing service, the method comprising:
    displaying to a user of the collaborative conferencing service, a plurality of user groups, each user group comprising a respective plurality of users participating in a respective virtual space room;
    enabling the user, when participating in a particular virtual space room, to communicate only with other users in the user group participating in that virtual space room; and enabling the user to cease participating in the particular virtual space room and begin participating in another virtual space room to communicate with other users participating in that other virtual space room.

2. The method of claim 1, wherein displaying the plurality of user groups comprises displaying, for a user group associated with a particular virtual space room, a respective image associated with each user participating in the particular virtual space room.

3. The method of claim 2, comprising displaying an image associated with the user to each other user participating in the particular virtual space room.

4. The method of claim 1, comprising enabling the user to display information from a directory associated with another user.

5. The method of claim 4, comprising enabling the user to display information from a directory associated with a second user found in a directory of a first user.

6. The method of claim 4, wherein enabling the user to display information from the directory associated with the other user comprises enabling the user to display information which is limited by permissions set by the other user.

7. The method of claim 6, wherein the permissions limit which users can display the information to specified users.

8. The method of claim 6, wherein the permissions limit which users can display the information to specified groups of users.

9. The method of claim 6, wherein the permissions limit the information which the user can display to the information associated with specified users.

10. The method of claim 6, wherein the permissions limit the information which the user can display to specific records in the directory.

11. A system for providing a collaborative conferencing service, the system comprising:
a server configured to:
send to a user device of a user of the collaborative conferencing service information to enable display of a plurality of user groups, each user group comprising a respective plurality of users participating in a respective virtual space room;
enable the user, when participating in a particular virtual space room to communicate only with other users in the user group participating in that virtual space room; and
enable the user to cease participating in the particular virtual space room and begin participating in another virtual space room to communicate with other users participating in that other virtual space room.

12. The system of claim 11, wherein the server is configured to send information to enable display of the plurality of user groups by sending information enabling display, for a user group associated with a particular virtual space room, a respective image associated with each user participating in the particular virtual space room.

13. The system of claim 12, wherein the server is configured to send information to the user device to enable display of an image associated with the user to each other user participating in the particular virtual space room.

14. The system of claim 11, wherein the server is configured to send information to the user device to enable the user to display information from a directory associated with another user.

15. The system of claim 14, wherein the server is configured to send information to the user device to enable the user to display information from a directory associated with a second user found in a directory of a first user.

16. The system of claim 14, wherein the server is configured to send information to enable the user to display information from the directory associated with the other user by sending information to enable the user to display information which is limited by permissions set by the other user.

17. The system of claim 16, wherein the permissions limit which users can display the information to specified users.

18. The system of claim 16, wherein the permissions limit which users can display the information to specified groups of users.

19. The system of claim 16, wherein the permissions limit the information which the user can display to the information associated with specified users.

20. The system of claim 16, wherein the permissions limit the information which the user can display to specific records in the directory.

* * * * *